Patented Jan. 28, 1947

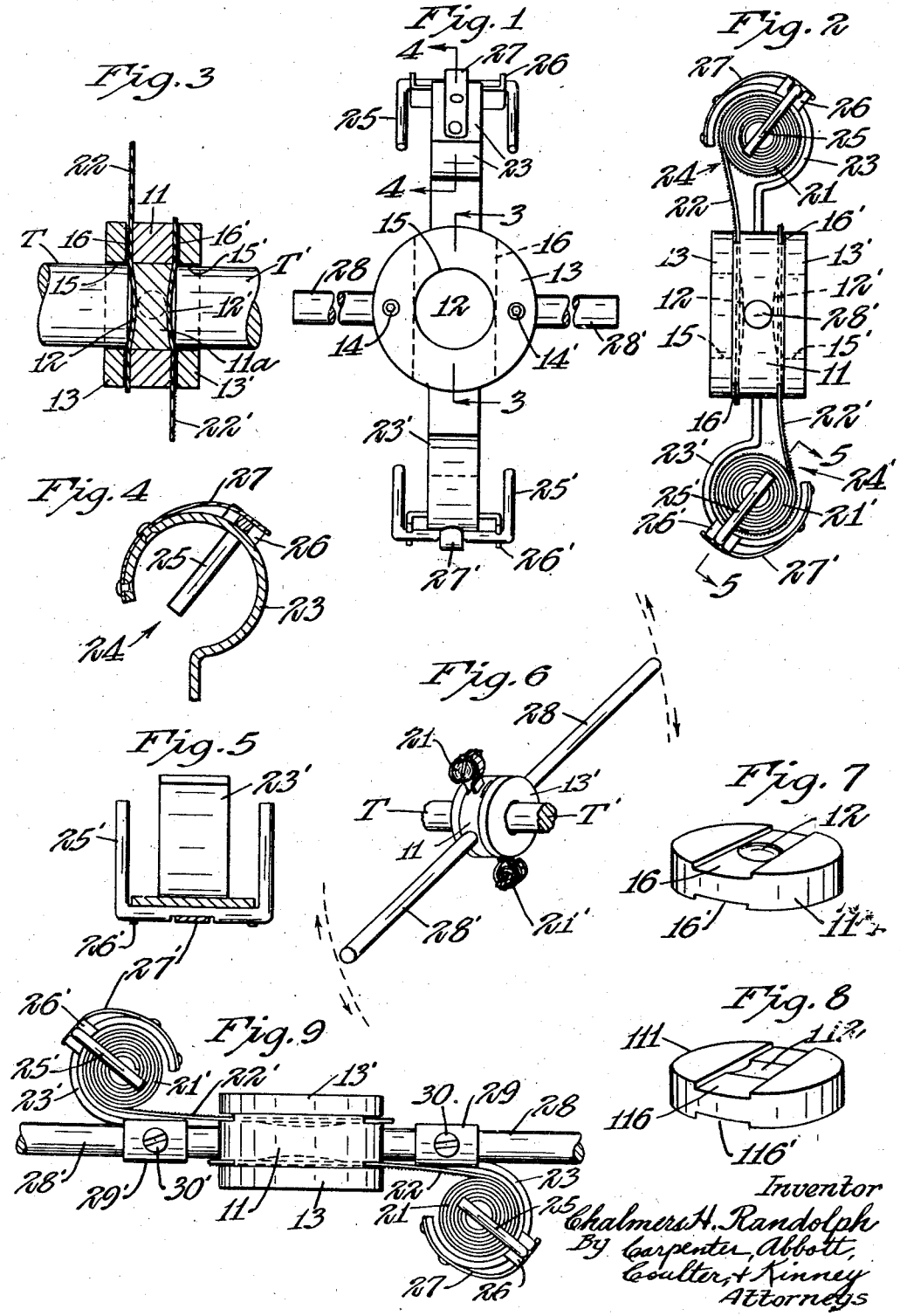

2,414,834

UNITED STATES PATENT OFFICE 2,414,834

WELDING TIP POLISHER

Chalmers H. Randolph, St. Paul, Minn., assignor to Minnesota Min'ng & Manufacturing Company, St. Paul, Minn., a corporation of Delaware Application April 7, 1944, Serial No. 529,972

3 Claims. (Cl. 51—187)

This invention relates to an abrading device for polishing or abrading the working faces of the welding electrodes or "tips" in electric welding devices, particularly in spot welders.

It is well-known that the working faces of the welding or "weld" tips become pitted or otherwise scarred or out of shape so that they must be periodically reshaped and/or resurfaced. Heretofore this has usually been accomplished by dismounting the tips and removing them from the welder, cutting, grinding or otherwise resurfacing them, and then mounting them back in the welder again.

Objects of the present invention include the provision of a device that will cheaply, quickly and accurately reshape and/or resurface either one or both of a pair of tips simultaneously without dismounting or removing them from the welder.

The present invention provides a device for abrading or polishing end surfaces of welding tips by means of abrasive tape, i. e. sheeted abrasive cloth or paper, etc., cut in a narrow strip. The device comprises an "anvil" member adapted to go between the tips and against either side of which the tips press when they are in abrading position, i. e. when they are being abraded, guide members adjacent the sides of the tips so that the tips may rotatably support the anvil when in abrading position, and guide means for holding abrasive tape between the face of each tip and the anvil so that rotation or oscillation of the anvil will polish the tips. The invention also provides holding means for supply rolls of abrasive tape. The anvil face may be of a shape complementary to the desired shape of the tip face.

A spot weld tip polisher illustrative of this invention is described below and illustrated in the accompanying drawing, in which Figure 1 is a front elevation of the illustrated polisher;

Figure 2 is a side elevation thereof;

Figure 3 is an axial cross-section on the line 3—3 in Figure 1 of the anvil and tip guides with two welding tips shown in abrading position;

Figure 4 is a cross-section on the line 4—4 in Figure 1 of a supply roll holder;

Figure 5 is a cross-section on the line 5—5 in Figure 2 of a supply roll holder;

Figure 6 is a perspective view of the illustrated polisher with two weld tips in abrading position;

Figure 7 is a perspective view of the anvil;

Figure 8 is a perspective view of an alternative form of anvil; and

Figure 9 is an elevational view of an alternative form of the device.

A platen or "anvil" member 11 is provided with two opposed working faces 12 and 12'. Welding tip guides in the form of the annular members 13 and 13' are fastened by suitable means such as screws or bolts 14—14', to either side of the anvil adjacent the anvil faces 12—12' in such position that welding tips T—T' will pass through the apertures 15—15' of the guide rings 13—13' when the tips are being pressed against the anvil faces in abrading position.

Guide means for threading and holding a length of abrasive tape between the end or face of each tip T or T' and the corresponding adjacent face 12 or 12' of the anvil, is provided by the respective walls of two passageways that are formed by channels or slots 16 and 16' which are cut across the faces of the anvil adjacent the inner faces of the tip guide rings 13—13'. The reference numerals 16 and 16' will be used herein to designate the said tape guide means on either side of the anvil, respectively.

Means for holding supply rolls 21—21' of abrasive tape 22—22' are provided in the form of two roll holders fixed by suitable means conveniently near the anvil in such position that tape led from the rolls may be passed through the respective tape guides 16—16' into abrading position. Each roll holder is shown here as comprising a cylindrical collar 23 having an opening 24 through which tape may be led from the roll within the collar toward the anvil. To retain the roll laterally within the collar, arms 25 which extend across each end of the collar are pivotally mounted on the collar at 26. The arm structure is U-shaped and is formed from a rod of circular cross-section that is flattened on one side at the center of the bight of the U so that the leaf spring 27 bearing against the flattened portion normally holds the arms 25 yieldingly in the desired roll-retaining position (Figures 4 and 5). The arms may be swung about their pivots 26 away from their normal position by pressure of the operator's fingers to permit insertion of a fresh roll.

Means for rotating or oscillating the anvil so as to perform the abrading operation is provided in the form of handles 28—28', for manual rotation.

In operation, the arms 25—25' are swung away from their normal position by pressure of the operator's fingers, whereupon rolls 21—21' of abrasive tape 22—22' are inserted in the collars 23—23' in a position so that when the tape is led from the rolls across the anvil the abrasive side of the tape will face away from the anvil toward the face of the tip that it is to abrade. The arms 25—25' are then swung back to normal position across the open ends of the collars where they are held by the springs 27—27', thereby retaining the rolls within the collars 23—23' (Figure 2). The tapes are then threaded from the rolls through the tape guides 16—16' until they extend entirely across the anvil's working faces 12 and 12' respectively (Figures 2 and 3).

The pair of welding tips T—T' (Figures 3 and 6) that are to be abraded while still normally mounted in the welding apparatus (broken away in the drawing) of which they are a part, are then withdrawn from each other or "opened" far enough to permit the polishing apparatus to be inserted between them. They are then moved back toward each other until they both enter the apertures 15—15' in the ring shaped tip guides 13—13' and press against the anvil faces 12 and 12' respectively, whereupon the anvil and attached parts are rotated or oscillated about the axes of the stationary tips by the handles 28—28', thus polishing or abrading the ends of the weld tips by reason of the abrasive tape lying between the tips and the anvil faces with the abrasive side toward the tips.

It will be obvious that many alternatives to the above-described parts and features may be employed without departing from the invention.

For example the anvil 11, here shown as cylindrical, may be of any convenient shape so long as it has opposing faces against which welding tips may bear when they are held in the welding apparatus of which they are a part. The anvil faces need not necessarily be complementary to the tip faces. They may be flat or partially complementary. For example, the anvil faces illustrated herein are shown as being fully complementary to the illustrated tip faces, i. e. they are saucer-like in shape, or more accurately stated, each face 12—12' is a concave surface of revolution of a curved line about a normal axis. Alternatively, the faces may be of other shapes; for example, they may be trough-like in shape, i. e. each face may be a concave surface of revolution of a straight line about a parallel axis (as indicated by the face 112 in Figure 8). This latter trough-like shape is of particular advantage when the abrasive tape is relatively stiff since it requires the tape to be flexed in only one direction, whereas a saucer-like face tends to force the tape over all portions of the tip face, flexing it in all directions at once.

If desired, the central portion of the anvil in which the faces are formed may be a section (such as 11a in Figure 3) of any convenient shape or size separate from the rest of the anvil but fixed thereto by suitable means to form a unitary anvil structure. This permits ready replacement of worn faces or of a face of one size or contour by another, and it also permits the face portion of the anvil to be made of materials specially tempered or differing in any desirable way from the rest of the anvil.

The channels 16—16' which provide the tape guide elements are shown here as being cut in the anvil 11, but alternatively, they may be cut in the ring-shaped tip guides 13—13' or partly in the anvil and partly in the tip guides; or, if tip guides of shapes other than the ring-shaped members 13—13' are used, other suitable tape guide elements may be employed so long as means are provided for guiding the tape into position across the anvil face.

As previously indicated, the tips T—T' and the tip guides 13—13' preferably, but not necessarily, relate to each other as journal and bearing during an abrading operation, in which case the tip receiving apertures 15—15' and the tips T—T' are preferably approximately complementary in size and sufficiently complementary in general shape so that the one may be rotatably supported by the other. The tip guides are here shown as ring-shaped elements 13—13' with cylindrical shaped tip receiving apertures 15—15', but they may be of other suitable shapes so long as means are provided for holding the tips and the anvil in desired positional relationship to each other while the anvil is being rotated or oscillated during an abrading operation. However the tips may be pressed inwardly toward each other so tightly against the anvil that the anvil will be supported thereby without the aid of the tip guides 13—13' in which case the shape and/or size of the tip receiving apertures 15—15' is immaterial. It will be apparent, however, that accurate and precise abrading of tips is best accomplished when there is a minimum of change of positional relationship between the tips and the polisher (other than the normal rotation or oscillation of the latter) during an abrading operation.

The supply roll holding means 23—23' here shown as supported by the anvil 11 may alternatively be supported by other parts of the apparatus; e. g., they may be fixed to handles 28—28' by suitable means such as welding, or they may be adjustably carried on the handles 28—28' by slidable collars 29—29' equipped with set screws 30—30' as shown in Figure 9; or they may be fixed to the tip guides 13—13', etc. Also means other than the illustrated collars 23—23' may be used for the roll holding means, such as spools, spindles, etc. In fact, welding tips may be polished by inserting short lengths of tape into the guides 16—16' with no supply rolls 21—21' of tape attached to the device at all, but the provision of roll holders is advantageous and permits the supplying of fresh tape for the abrading operation as frequently as is desired and without loss of time.

Various other alternatives will be obvious to those skilled in the art as usable for the carrying out of this invention without departure therefrom; also it is to be understood that the spot weld tip polisher described and illustrated herein is simply illustrative of this invention, the scope of which is defined only by the claims.

I claim:

1. A weld tip polisher comprising an anvil member adapted to be inserted between two mounted tips, tip guide members positioned to be adjacent the sides of the tips when the tips are in abrading position, guide means for threading and holding a length of abrasive tape between the face of a tip and the anvil and means for holding a supply roll of abrasive tape comprising a cylindrical collar adapted to receive a roll of tape, the collar having a side opening through which tape may be led from a roll thereof within the collar toward the anvil and having means for retaining a roll in the collar comprising pivotally mounted arms extending across the open ends of the collar with spring means adapted yieldingly to hold the arms in roll-retaining position.

2. A weld tip polisher comprising an anvil member adapted to be inserted between two mounted tips, tip guide members positioned to be adjacent the sides of the tips when the tips are in abrading position, guide means for threading and holding a length of abrasive tape between the face of a tip and the anvil, means for holding a supply roll of abrasive tape comprising a cylindrical collar adapted to receive a roll of tape, the collar having a side opening through which tape may be led from a roll thereof within the collar toward the anvil and having means for retaining a roll in the collar comprising pivotally mounted arms extending across the open ends of the collar with spring means adapted yieldingly to hold the arms in roll-retaining position, and means for manual rotation of the polisher comprising two elongate handle members of approximately equal length on opposite sides thereof extending outwardly in opposite directions in approximate alignment with each other.

3. A weld tip polisher comprising an anvil member adapted to be inserted between two mounted tips, tip guide members positioned to be adjacent the sides of the tips when the tips are in abrading position, guide means for threading and holding a length of abrasive tape between the face of a tip and the anvil and means for holding a supply roll of abrasive tape comprising a cylindrical collar adapted to receive a roll of tape, the collar having a side opening through which tape may be led from a roll thereof within the collar toward the anvil and having means for retaining a roll in the collar.

CHALMERS H. RANDOLPH.